United States Patent [19]
Eastman

[11] Patent Number: 6,119,072
[45] Date of Patent: Sep. 12, 2000

[54] CALIBRATION METHOD FOR TRANSMISSION CONTROL CLUTCHES

[75] Inventor: Briton Todd Eastman, Coffeyville, Kans.

[73] Assignee: Deere & Company, Moline, Ill.

[21] Appl. No.: 09/007,592

[22] Filed: Jan. 15, 1998

[51] Int. Cl.$^7$ .................................................. F16D 21/04
[52] U.S. Cl. ............................................. 702/85; 477/78
[58] Field of Search ..................... 310/78, 75 R, 310/76, 92–96, 100; 702/85, 98, 100, 138, 140, 142, 189, 199; 477/78, 97

[56] References Cited

U.S. PATENT DOCUMENTS

| | | |
|---|---|---|
| 4,646,891 | 3/1987 | Braun . |
| 4,855,913 | 8/1989 | Brekkestran et al. . |
| 4,899,858 | 2/1990 | Cote et al. . |
| 4,967,385 | 10/1990 | Brekkestran et al. . |
| 4,989,471 | 2/1991 | Bulgrien . |
| 5,082,097 | 1/1992 | Goeckner et al. ......................... 477/80 |
| 5,224,577 | 7/1993 | Falck . |
| 5,249,658 | 10/1993 | Goeckner et al. . |
| 5,335,174 | 8/1994 | Kohno et al. .............................. 701/68 |
| 5,337,871 | 8/1994 | Testerman . |
| 5,626,534 | 5/1997 | Ashley et al. ............................. 477/79 |
| 5,842,375 | 12/1998 | Reeves et al. ............................. 74/335 |
| 5,853,076 | 12/1998 | McKee et al. ......................... 192/87.14 |

OTHER PUBLICATIONS

SAE Technical Paper Series No. 861212, Sep. 1986, Goodbar, J.E. and Testerman, M.D., entitled "The Design And Development of a Four Speed Powershift Transmission with Electronic Clutch Pressure Modulation".

Ford New Holland, "Part 5—Transmission Systems (Post Mar. 1990)" published 1990, pp. 1–7.

Copy of U.S. Patent Application 07/521,504 (Bulgrien et al.) filed May 10, 1990, now abn.

*Primary Examiner*—Marc S. Hoff
*Assistant Examiner*—Craig Steven Miller

[57] ABSTRACT

The hydraulically operated clutch elements of a powershift transmission have hold pressures which are calibrated by determining a parasitic drag time value represent a speed change of a clutch component due to a friction characteristic of the transmission, by calculating a target speed change value from the parasitic drag time valueas, and by deriving the clutch calibration values from the target speed change value.

3 Claims, 8 Drawing Sheets

019,072

CALIBRATION METHOD FOR TRANSMISSION CONTROL CLUTCHES

BACKGROUND OF THE INVENTION

This invention relates to a transmission control system, and more particularly to a calibrating method for determining key parameters relating to the operation and control of the transmission control clutches.

Some manufacturers have used versions of electrohydraulic transmission controls which include proportionally controlled valves. In such systems with proportional control valves it is possible and desirable to accurately control the torque capacities of the clutches during engagement. While the electrical command supplied to the control valve may be very precise, manufacturing tolerances in the valves and transmission cause large variations on an actual vehicle. If it is known what electrical command corresponds to the initial clutch engagement pressure which causes a clutch to just begin carrying torque, then this command could be used to modify the shift command for that clutch during shifting to provide optimized control. For example, U.S. Pat. No. 4,855,913, issued Aug. 8, 1989 to Brekkestran et al., discloses that the key parameters in the control system include the initial clutch engagement pressure (represented by DC-MAX) and the fast-fill clutch delay (represented by T1). The Brekkestran reference further states that DC-MAX and T1 must be determined by laboratory or field tests. However, the Brekkestran reference does not disclose any method for determining these values.

A calibrating method or a method of determining the pressure necessary to achieve clutch engagement in a microprocessor-based transmission control system is described in U.S. Pat. No. 4,989,471, issued on Feb. 5, 1991 to Bulgrien. The Bulgrien method includes braking the transmission output shaft, then gradually increasing the clutch pressure and saving a value corresponding to the clutch pressure at which the engine speed begins to decrease. However, this method relies upon the resistance to rotation due to use of the vehicle brakes to prevent rotation of the transmission output shaft. Such a procedure could be dangerous if the vehicle brakes are not applied or if the brakes fail, because then undesired vehicle motion could result during calibration. The Bulgrien patent also illustrates an alternate method of calibrating a clutch by sensing when the clutch transmits sufficient torque to move the vehicle. This alternate method requires that the vehicle be placed in a position where vehicle motion is not a safety concern, and the results of such a method will vary depending upon the terrain on which the vehicle is placed. The Bulgrien patent also depends on sensing variations in engine speed, and is therefore susceptible to variations in engines and engine governors.

U.S. Pat. No. 5,082,097, issued on Jan. 21, 1992 to Goeckner et al. discloses a calibrating system or a system for determining a current signal corresponding to the point at which the clutch begins to transmit torque. This system requires sensing either vehicle movement or engine speed droop, and thus depends on sensing variations in engine speed, and is therefore susceptible to variations in engines and engine governors, or requires possibly dangerous vehicle movement.

Another calibration method is described in U.S. Pat. No. 5,224,577, issued Jun. 7, 1993 to Falck et al. and assigned to the assignee of the present application. This method also involves sensing engine speed droop, and is therefore susceptible to variations in engines and engine governors.

Another calibration method is disclosed in U.S. Pat. No. 5,337,871, issued Aug. 16, 1994 to Testerman, and assigned to the assignee of the present application. However, this method requires pressure sensors, which are expensive, and which are not as accurate or reliable as rotation speed sensors.

Another calibration method is disclosed in U.S. patent application Ser. No. 08/800,431, filed Feb. 8, 1997 now U.S. Pat. No. 5,842,375, and assigned to the assignee of the present application. In this method the target deceleration time used for determining the hold pressure must be determined empirically as an average based on measurements taken from a number of sample transmission. However, if the actual parasitic drag of a production transmission is significantly different from that of the sample transmissions, then the torque produced by the resulting hold pressure of the clutch being calibrated would be different from what is desired. Accordingly, it would be desirable to measure a parasitic drag time for each transmission prior to determining the hold pressure of each clutch, and then use the actual parasitic drag time to calculate the target deceleration time required to produce a given hold torque.

SUMMARY OF THE INVENTION

An object of the present invention is to provide a method of calibrating or determining key parameters for the control of proportional control valves for a powershift transmission.

Another object of the invention is to provide such a method which is not effected by variations in parasitic drag for different transmissions.

These and other objects are achieved by the present invention wherein a parasitic drag time is measured, the measured parasitic drag time is used to calculate the target deceleration time required to produce a given hold torque, and then the hold pressure of each clutch is determined.

BRIEF DESCRIPTION OF THE DRAWINGS

FIGS. 6A, 6B and 6C together comprise a simplified logic flow diagram illustrating an alternate hold pressure calibration method of the present invention.

DETAILED DESCRIPTION

Figure 1:
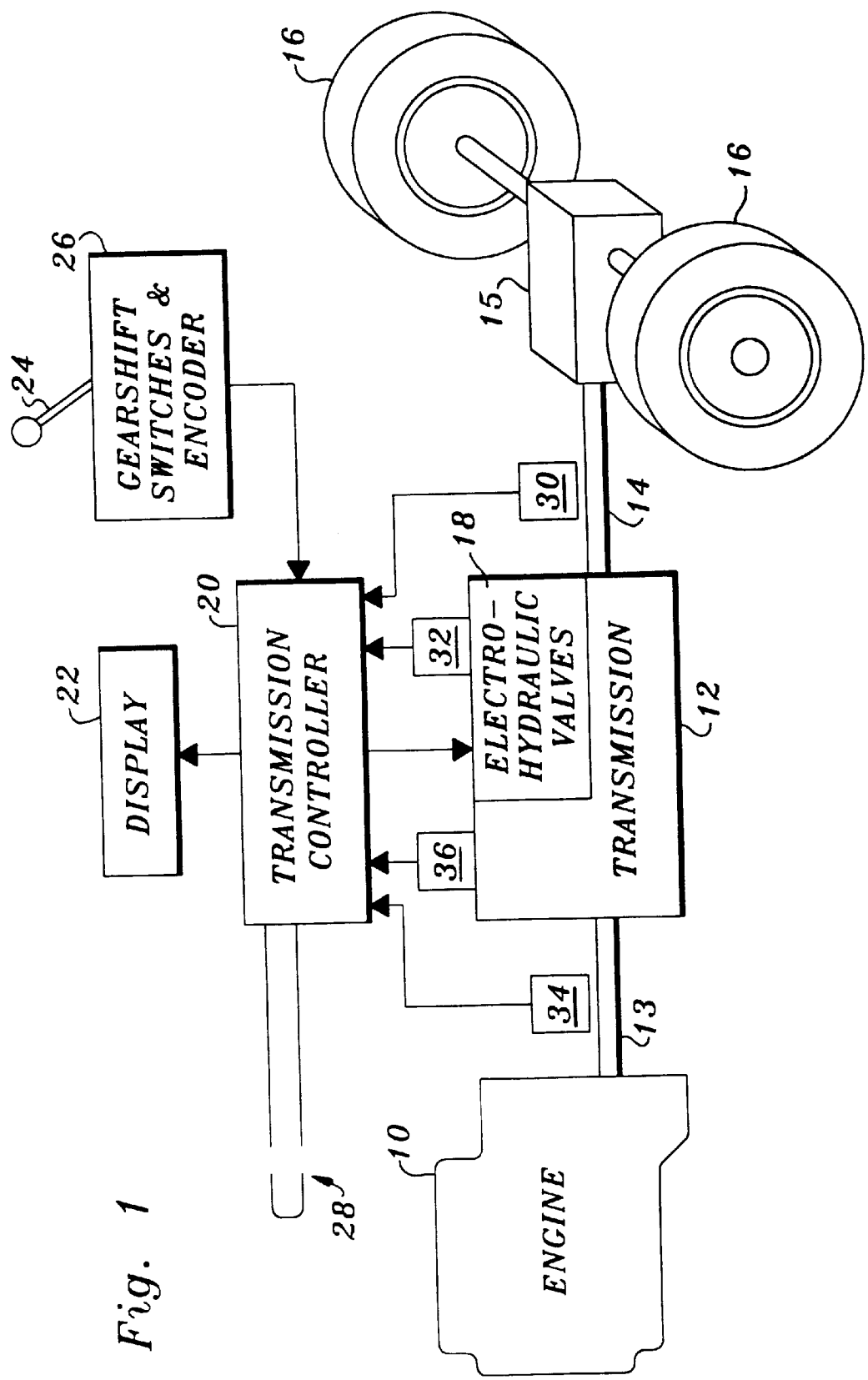
FIG. 1 is a schematic block diagram of a microprocessor-based transmission control system to which the present invention is applicable.

As shown in FIG. 1, a vehicle power train includes an engine 10 which drives, via input shaft 13, a power shift transmission 12, which, via output shaft 14 and differential 15, drives wheels 16. The power shift transmission 12 is operated by a set of electrohydraulic valves 18 which are controlled by signals from a microprocessor based transmission controller 20. The transmission 12 may be a transmission such as a DF 150 or DF 250 powershift transmission manufactured by Funk Manufacturing, Inc., but the invention could be applied to other powershift transmissions as well.

The transmission controller 20 is connected to a display 22 and to a gearshift lever 24 via a gearshift switch/encoder unit 26 such as commercially available from Funk Manufacturing for use with its production DF 150 and DF 250 powershift transmissions. The transmission controller 20 is also connected to an electrical jumper 28. Mag pickup rotation speed sensors 30, 32, 34 and 36 provide rotation speed signals to the controller 30, as will be described in more detail hereinafter.

The transmission control unit 20 includes a commercially available microprocessor (not shown) which, in response to connection of jumper 28, executes a computer program which implements operation of the calibration methods described hereinafter. The transmission control unit 20 also includes valve drivers (not shown) which provide variable duty cycle pulse-width-modulated voltage control signals to the valves 18. The transmission control unit 20 and the valve drivers (not shown) will generate such control signals as a function of various sensed and operator determined inputs in order to achieve a desired pressure in the clutches and to thereby control the shifting of the transmission 12 in a desired manner. However, the present invention is not concerned with the control of the shifting of the transmission 12, the transmission 12 itself, or the valves 18, since the present invention is concerned only with the calibration of certain parameters. The method of the present invention is implemented by the control unit 20 which executes a computer program, which includes portions related to the algorithms illustrated by FIGS. 4A, 4B and 4C, and FIGS. 6A, 6B and 6C. Further information on other aspects of the computer program is included in U.S. patent application Ser. No. 08/800,431 now U.S. Pat. No. 5,842,375, which is hereby incorporated by reference herein.

Figure 2:
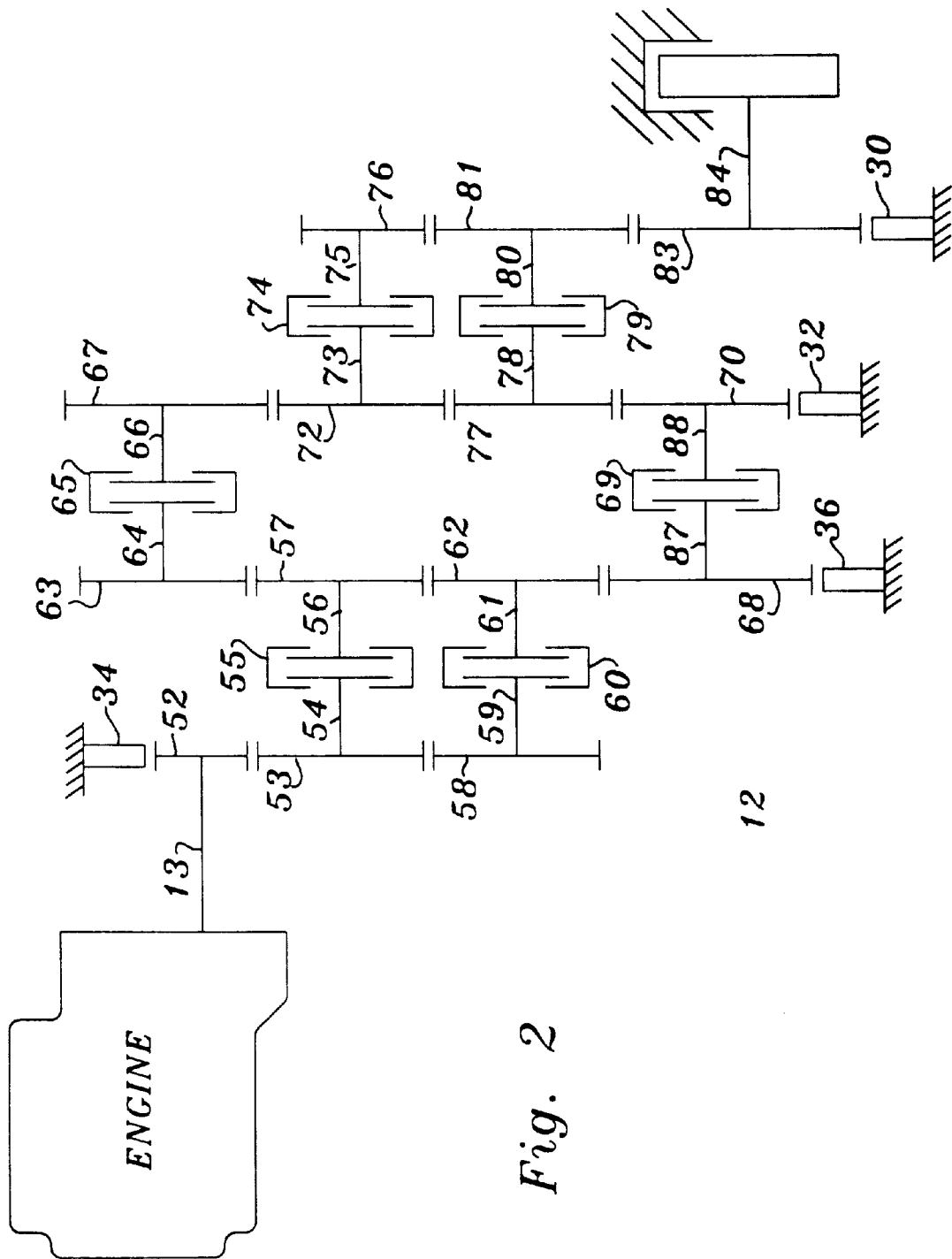
FIG. 2 is a schematic representation of a transmission to which the present invention is applicable.
Figure 4C:
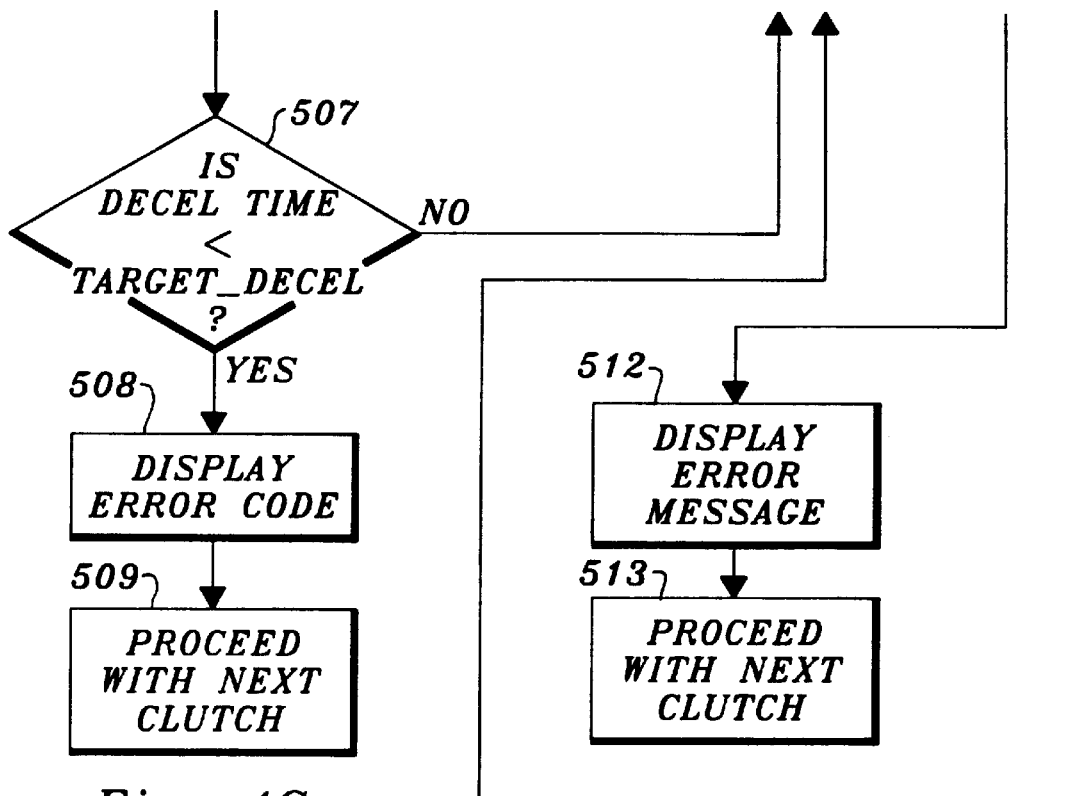
FIGS. 4A, 4B and 4C together comprise a simplified logic flow diagram illustrating a hold pressure calibration method of the present invention.
Figure 4C:
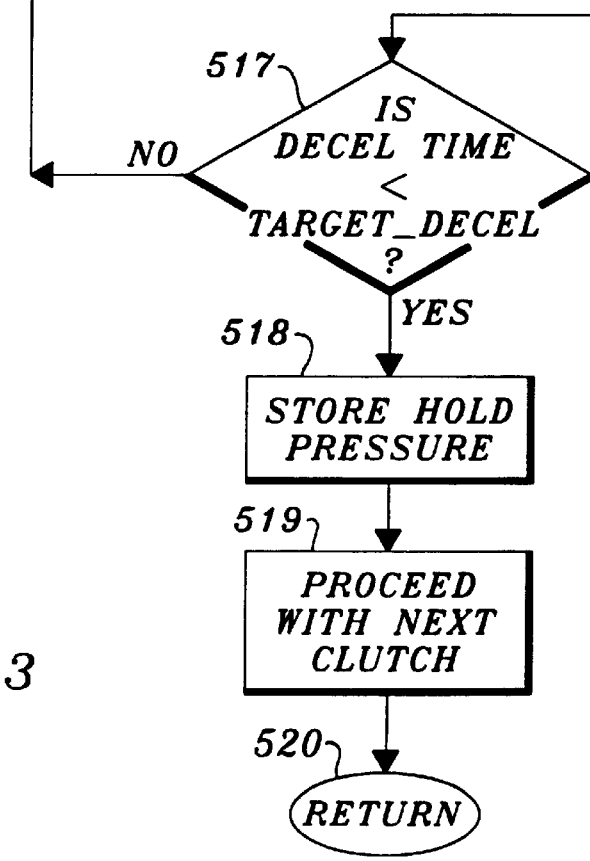
Figure 3:
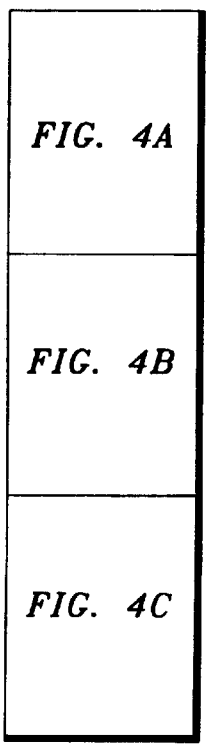
FIG. 3 illustrates the relationship between FIGS. 4A, 4B and 4C.
Figure 4A:
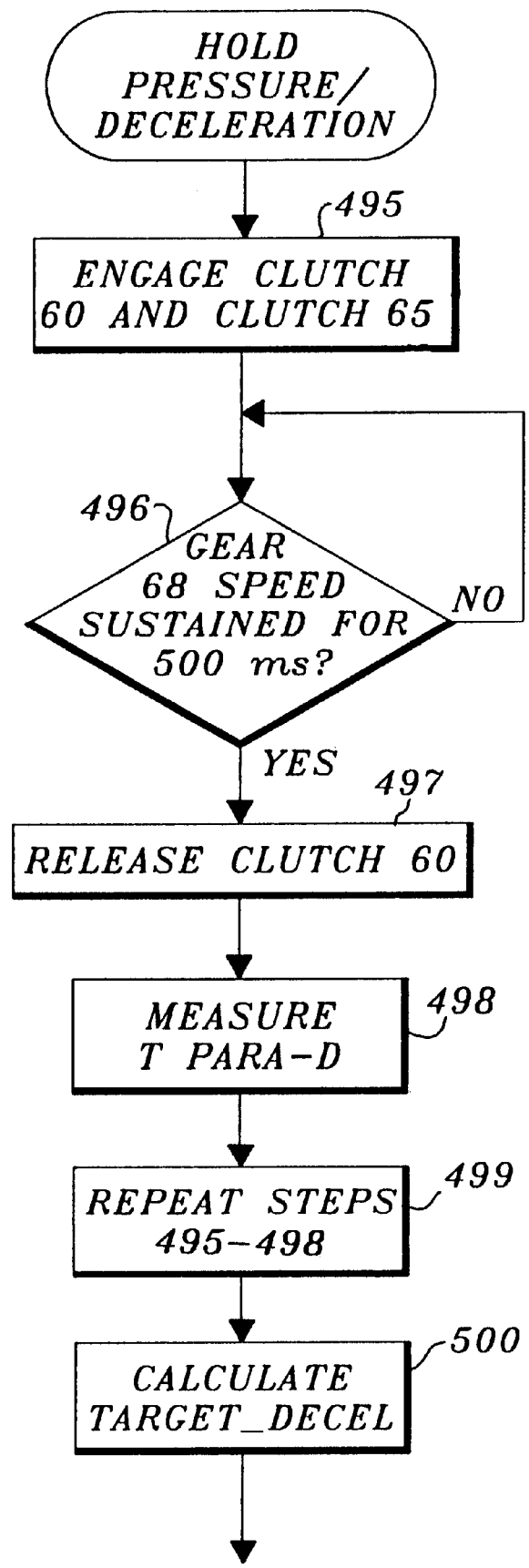
Figure 4B:
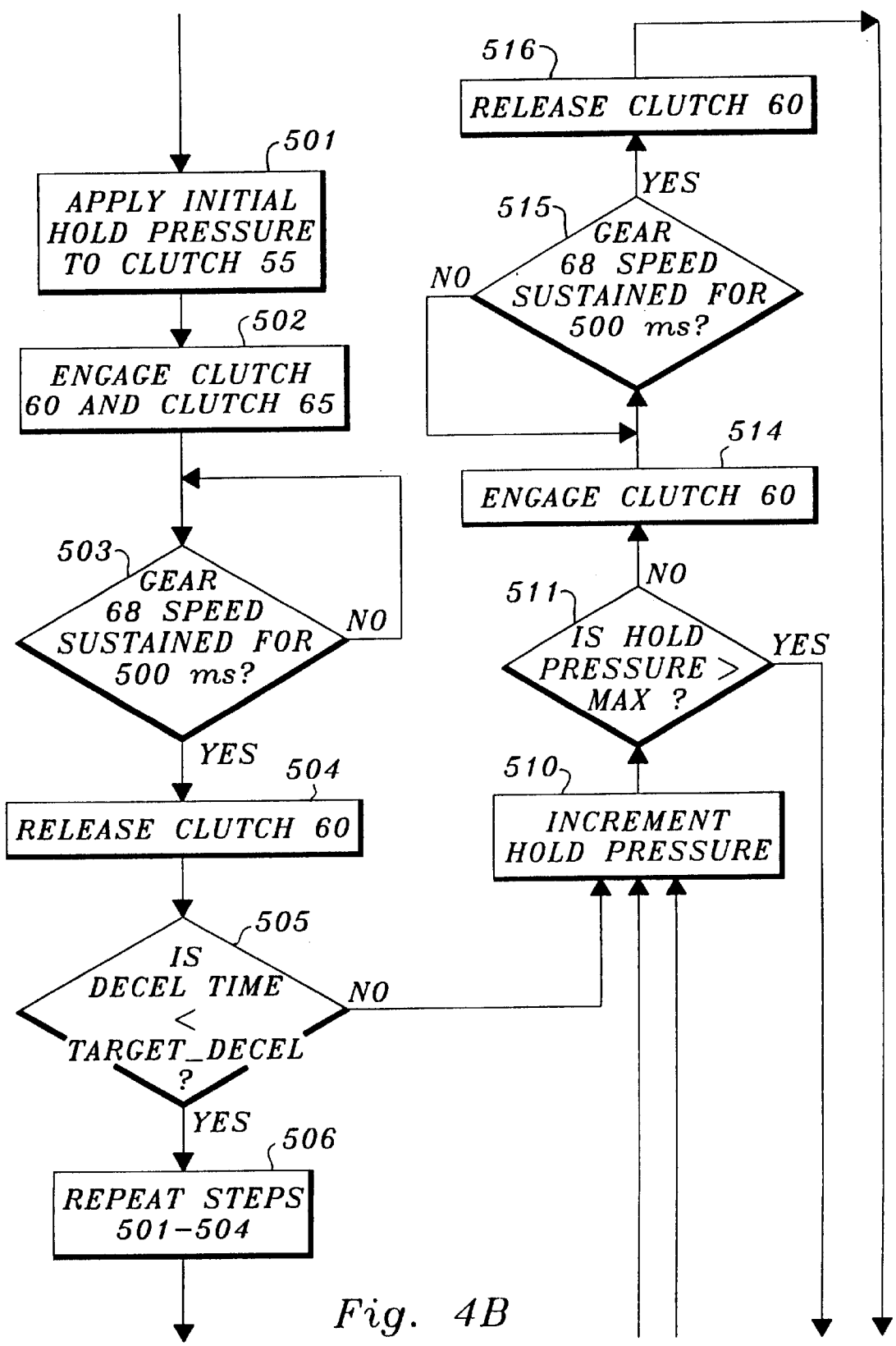

Referring to FIG. 2, the transmission shown has 6 clutches 55, 60, 65, 69, 74 and 79. The input shaft 13 is mounted to gear 52 that meshes with gear 53 and 58. Shafts 54 and 56 turn the same speed when clutch 55 is fully engaged. Shafts 59 and 61 turn the same speed when clutch 60 is fully engaged. Shafts 64, 56, 61 and 87 are connected to gears 63, 57, 62 and 68 respectively. Shafts 64 and 66 turn the same speed when clutch 65 is engaged. Shafts 87 and 88 turn the same speed when clutch 69 is engaged. Shafts 73 and 75 turn the same speed when clutch 74 is engaged. Shafts 78 and 80 turn the same speed when clutch 79 is engaged. In order to transmit power from input shaft 13 to output shaft 84, three clutches need to be engaged: either 55 or 60, and either 65 or 69, and either 74 or 79. Gears 63, 57, 62, and 68 are in constant mesh as are gears 67, 72, 77 and 70.

Mag pickup speed sensor 30 monitors output speed. Mag pickup speed sensor 32 monitors the speed of gear 70 which also provides calculated speeds for gears 67, 72 and 77. Mag pickup speed sensor 34 monitors input speed. Mag pickup speed sensor 36 monitors the speed of gear 68 which also provides calculated speeds for gears 62, 57 and 63. Gear 76 is connected to shaft 75 and gear 81 is connected to shaft 80. Gears 76, 81 and 83 all mesh to provide power out at shaft 84. Each of clutches 55, 60, 65, 69, 74 and 79 are activated (engaged) with hydraulic pressure supplied from electrohydraulic valves 18.

CALIBRATION METHODS

Hold Pressure-Deceleration

Referring now to FIGS. 3, 4A, 4B and 4C, the calibration method shown therein can be used to determine the hold pressures for all the clutches. The automatic calibration procedure is enabled by connecting the calibration jumper 28 to the transmission controller 20. Although not shown in FIG. 3, the controller continually checks to ensure the park brake (not shown) is applied, that oil temperature is above 69° F., that engine speed is running at about 1500 rpm, and that no sustained output shaft speed is detectable. If any of the checks determine a fault, the routine aborts. Once the calibration jumper 28 is installed and the engine speed and park brake are set, the shift lever 24 is moved from its neutral to its forward position to start the calibration process. Table 1 lists the clutch combinations for determining hold pressures for all the clutches.

TABLE 1

| Hold Pressure-Deceleration | | | |
|---|---|---|---|
| Clutch Calibrated | Clutch 1 | Clutch 2 | Gear Speed |
| 55 | 60 | 65 | 68 |
| 60 | 55 | 65 | 68 |
| 65 | 55 | 74 | 68 |
| 69 | 55 | 74 | 68 |
| 74 | 55 | 65 | 70 |
| 79 | 55 | 65 | 70 |

This calibration method will now be described for the calibration of clutch 55, with clutch 1 being clutch 60, clutch 2 being clutch 65 and with the speed of gear 68 being sensed by mag pickup 36. In step 495, clutches 60 and 65 are fully engaged. Step 496 checks speed sensor 36 to see if proper speed of gear 68 has been sustained for 500 milliseconds (ms). Once this gear speed has been sustained for 500 ms, clutch 60 is released in step 497. Then, determines the amount of time, Tpara_d, required for the rotation speed of gear 68 to decrease by a certain amount due to the parasitic drag of the involved transmission components. Step 499 causes steps 495–498 to be repeated at least three times and then until the last three measured Tpara_d times are within 5% of each other. Step 500 then calculates a target deceleration time value (target_decel), using average of the last three Tpara_d deceleration times and the following equation, $$\text{target\_decel} = [\text{low\_rpm} - (\text{engine cal\_spd} - \text{x\_rpm})]/[(-\text{Th}/\text{I}) + (\text{low\_rpm} - (\text{engine cal\_spd} - \text{x\_rpm}))/\text{Tpara\_d}],$$

where low_rpm is the approximately 200 rpm low speed cut off used to measure deceleration times, engine cal_spd is approximately 1600 rpm, x_rpm is approximately 150 rpm (both engine cal_spd and x_rpm are reset values selected for the particular type of transmission being calibrated), Th is the desired hold torque of the clutch being calibrated, I is the inertia of the rotating parts downstream of the clutch being calibrated which is calculated from the characteristics of the transmission, and Tpara_d is the parasitic drag deceleration time determined in step 500.

In step 501 an initial hold pressure, for example, 30 psi is applied to clutch 55. In step 502, clutches 60 and 65 are fully engaged, thus causing rotation of both the input and output elements of clutch 55 to rotate. Step 503 checks speed sensor 36 to see if proper speed of gear 68 has been sustained for 500 milliseconds(ms). Once this gear speed has been sustained for 500 ms, clutch 60 is released in step 504.

The rotation speed of the gears and shafts connected to gear 68 will begin to slow down because of friction and because clutch 55 is less than fully engaged. Step 505 determines the amount of time (deceleration time) required for the rotation speed of gear 68 to decrease by a certain amount. In step 505, if the measured deceleration time is less than the calculated and stored target deceleration time (target_decel), then step 506 causes steps 501–504 to be repeated. If in step 507 the deceleration time is again measured, and if it is still less than target_decel, then step 508 causes an appropriate error message to appear on display 22 and step 509 directs the routine to determine the hold pressure of another clutch.

If, in steps 505 or 507, the measured deceleration time is not less than target_decel then the routine proceeds to step 510, which increments the hold pressure by one increment. Step 511 checks to see if the hold pressure is greater than or equal to the maximum hold pressure allowable. If it is, step 512 causes an error message to be displayed and step 513 directs the routine to determine the hold pressure of another clutch. Otherwise, step 511 directs the algorithm to step 514 which re-engages clutch 60 so that the output of clutch 55 (shaft 56 and gear 57) will again be rapidly rotating. Step 515 then again checks that a certain gear speed has been sustained for 500 ms, then step 516 releases clutch 60. Step 517 again compares deceleration time to target_decel time. If it is greater, then the routine proceeds to step 510 and increments the hold pressure.

Eventually, when the pressure applied to clutch 55 attains the hold pressure value, clutch 55 will begin to engage and will transmit torque to shaft 56 and gear 57 which tends to slow the rotation of gear 57 and cause gear 57 to rotate in a direction opposite to the rotation caused by the engagement of clutch 60. When this happens, in step 517, the measured deceleration time will be less than the target_decel time and the hold pressure is stored by step 518. Step 519 repeats steps 501 through 518 for other clutches to be calibrated. Thus, the hold pressure has been determined by sensing a rotation speed of internal transmission component—gear 68, and without sensing engine speed droop and without causing vehicle movement.

Hold Pressure-Acceleration

Figure 5:
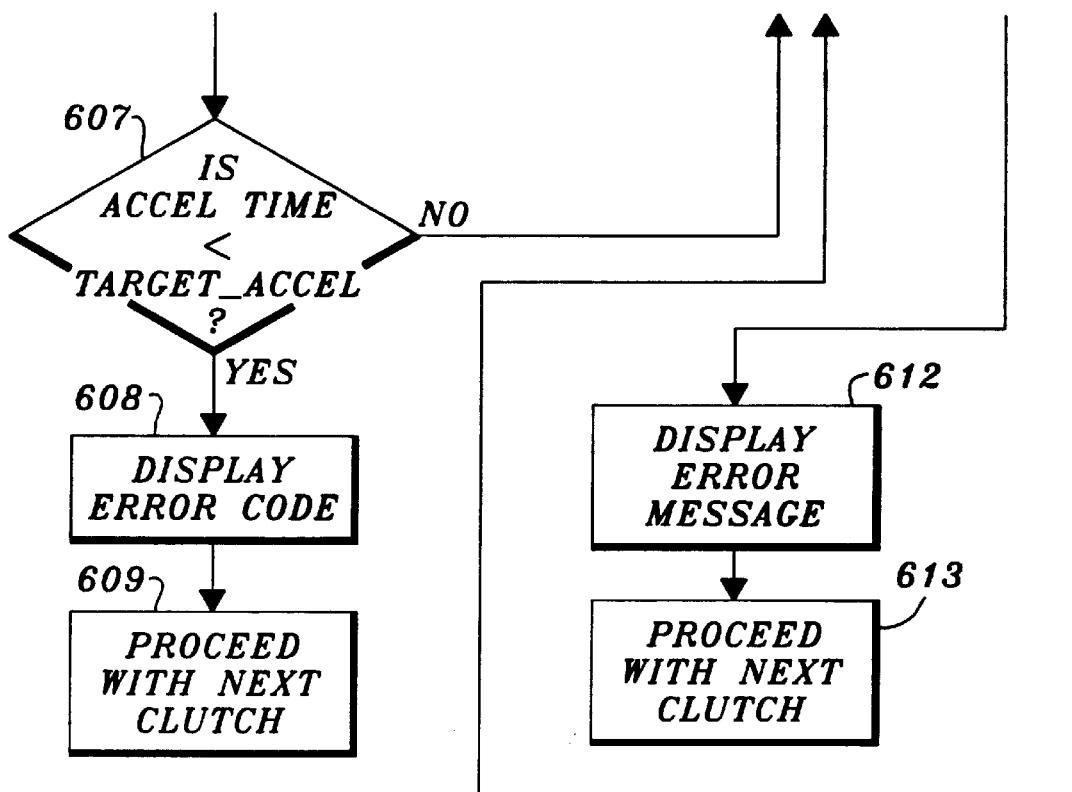
FIG. 5 illustrates the relationship between FIGS. 6A, 6B and 6C.
Figure 5:
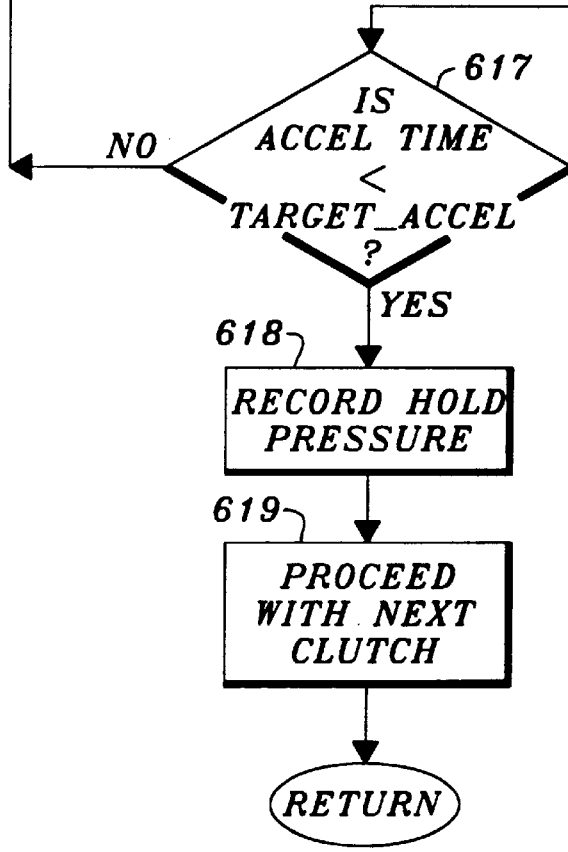
Figure 5:
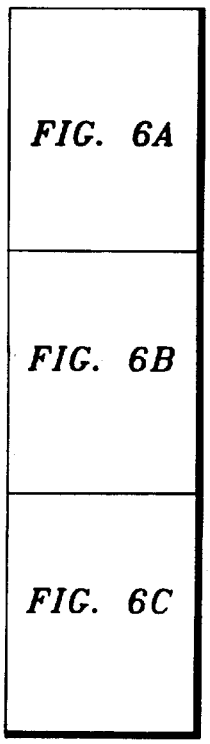
Figure 6A:
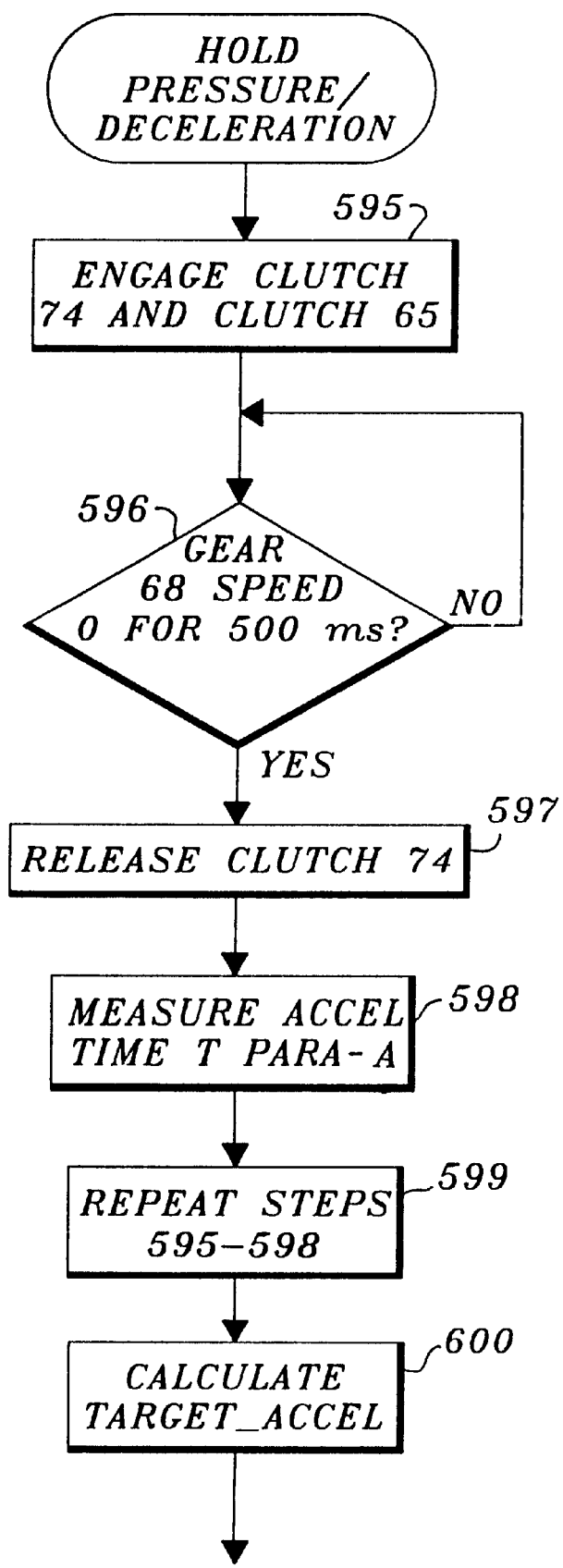
Figure 6B:
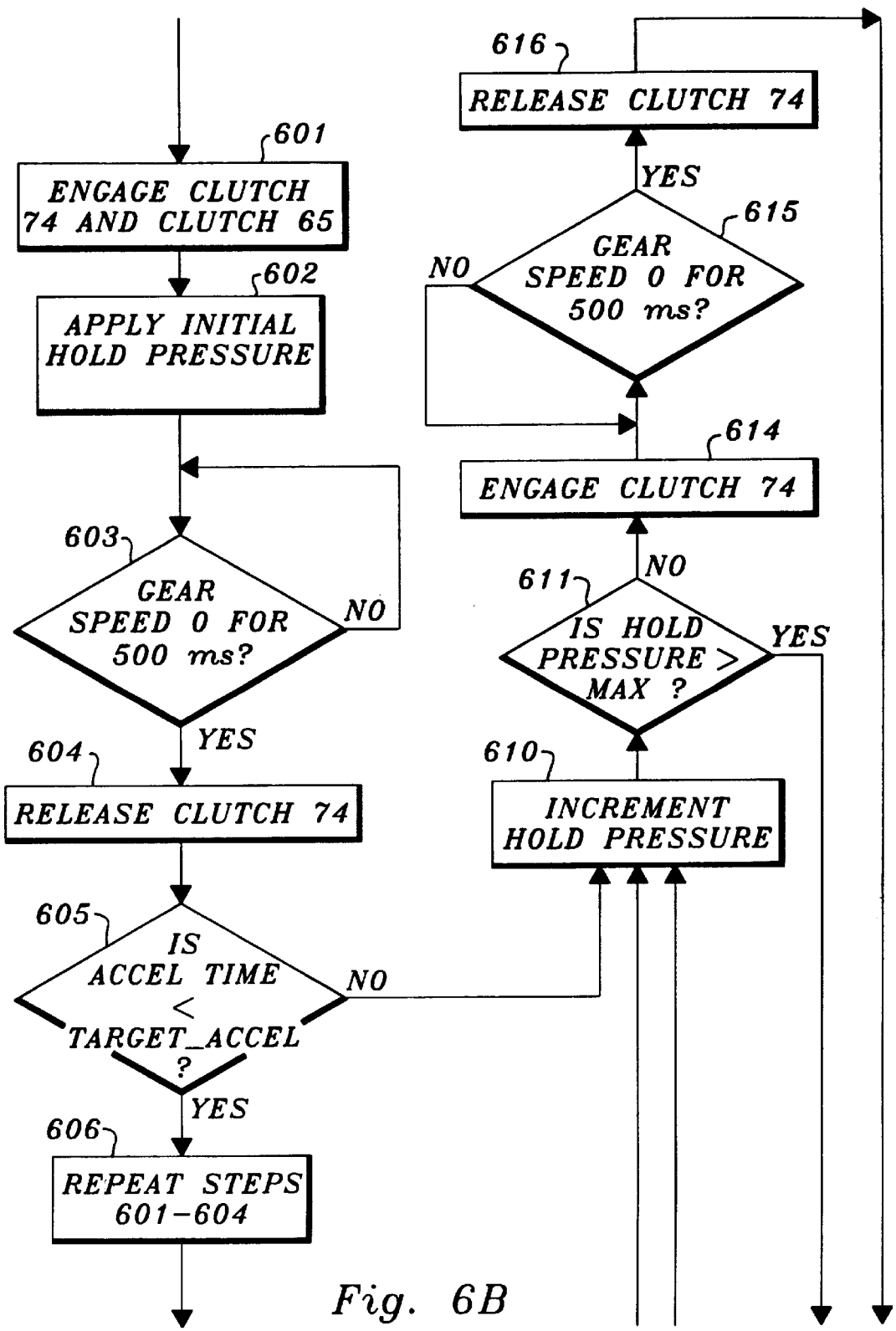

FIGS. 5, 6A and 6B show an alternate calibration method wherein hold pressure is determined by measuring the acceleration of an internal component of the transmission 12. For this particular transmission, this method may be applied to all clutches except 74 and 79. Table 2 lists the clutch combinations for determining hold pressures for clutches 55, 60, 65 and 69.

TABLE 2

| Hold Pressure-Acceleration | | | |
|---|---|---|---|
| Clutch Calibrated | Clutch 1 | Clutch 2 | Gear Speed |
| 55 | 74 | 65 | 68 |
| 60 | 74 | 65 | 68 |
| 65 | 74 | 55 | 70 |
| 69 | 74 | 55 | 70 |

FIGS. 6A, 6B and 6C will now be described for the calibration of clutch 55, with clutch 1 being clutch 74, clutch 2 being clutch 65 and with the speed of gear 68 being sensed by mag pickup 36. In step 595, clutches 74 and 65 are fully engaged. Step 596 checks speed sensor 36 to see if proper speed of gear 68 has been sustained for 500 milliseconds (ms). Once this gear speed has been sustained for 500 ms, clutch 74 is released in step 597. Then, step 598 determines the amount of time, Tpara_a, required for the rotation speed of gear 68 to increase by a certain amount due to the parasitic drag of the involved transmission components. Step 599 causes steps 595–598 to be repeated at least three times and then until the last three measured Tpara_a times are within 5% of each other. Step 600 then calculates a target acceleration time value (target_accel), using average of the last three Tpara_a acceleration times and the following equation, target_accel=[(engine cal_spd-x_rpm)-low_rpm]/[(Th/I)+((engine cal_spd-x_rpm)-low_rpm)/Tpara_a], where Tpara_a is the parasitic drag acceleration time determined in step 600, and the other factors are as previously described in connection with the equation for target_decel.

In step 601, clutch 74 and clutch 65 are fully engaged, thus preventing rotation of the output of clutch 55 and of gear 57. In step 602 an initial hold pressure is applied to clutch 55. Step 603 checks to verify the speed of gear 68 is 0 rpm for at least 500 ms. Step 604 releases clutch 74, allowing whatever torque is transmitted across clutch 55 to accelerate gear 68.

Step 605 measures the time it takes to accelerate the gear 68 up to a predetermined target speed for the initial hold pressure. If this time is less than the target_accel time then steps 601 through 604 are repeated in step 606. Step 607 measures the time it takes to accelerate gear 68 to the predetermined target speed. If this time is still less than the target acceleration time then step 608 displays on display 12 an appropriate error message and the routine continues on to finding the hold pressure of the next clutch in step 609.

If, in steps 605 or 607, the acceleration time to the predetermined speed is not less than target_decel then routine proceeds to step 610 and hold pressure is incremented and applied to clutch 55. Step 611 causes step 612 to display an error message if the hold pressure is greater than or equal to the maximum hold pressure, and the routine proceeds to the next clutch in step 613. Otherwise, step 614 engages clutch 74 and step 615 again checks that the speed of gear 68 is 0 rpm for 500 ms, and the routine proceeds to step 616 where clutch 74 is released.

The releasing of clutch 74 allows whatever torque is transmitted across clutch 55 to accelerate gear 68. Step 617 again compares the measured acceleration time to the stored reference time (target_accel). If the measured acceleration time is greater than target_accel, it means that the pressure applied to clutch 55 has not started to engage it yet, and the hold pressure is incremented in step 610. The loop continues until the measured acceleration time is less than the target_accel time and the hold pressure is then stored as the calibration value by step 618. Step 619 repeats the process for the other clutches listed in Table 2.

It should be noted that with this method only a minimal torque is transmitted through clutch 55. This results in a very small effect on engine pull down so that the calibration results are not affected by variations in engine characteristics.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A method of calibrating a control clutch of a transmission having an input shaft connected to an engine and having an output shaft, the transmission have a plurality of control clutches, each control clutch having an input element for receiving torque and having an output element, the method comprising the following steps:

measuring a parasitic drag time value representing a speed change of a clutch component due to a friction characteristic of the transmission;

calculating a target speed change value from the parasitic drag time value; and deriving a clutch calibration value from the target speed change value and from a sensed rotation speed of a transmission component.

2. A method of calibrating a control clutch of a transmission having an input shaft connected to an engine and having an output shaft, the transmission have a plurality of control clutches, each control clutch having an input element for receiving torque and having an output element, the method comprising the following steps:

a) maintaining the engine at a substantially constant speed;

b) measuring a parasitic drag time value representing a speed change of a clutch component due to a friction characteristic of the transmission;

c) calculating a target speed change value from the parasitic drag time value;

d) applying a test hydraulic signal to the clutch being calibrated;

e) sensing a rotation speed of a component of the transmission;

f) analyzing the sensed rotation speed as a function of the target speed change value; and g) if the analysis satisfies a predetermined criteria storing a value associated with the applied test pressure signal as the calibration value; and f) if the analysis does not satisfy said predetermined criteria, modifying the test hydraulic signal and repeating steps d) through f).

3. A method of calibrating a control clutch of a transmission having an input shaft connected to an engine and having an output shaft, the transmission have a plurality of control clutches, each control clutch having an input element for receiving torque and having an output element, the method comprising the following steps:

a) maintaining the engine at a substantially constant speed;

b) measuring a parasitic drag time value representing a speed change of a clutch component due to a friction characteristic of the transmission;

c) calculating a target speed change value from the parasitic drag time value;

d) applying a test hydraulic signal to the clutch being calibrated;

e) sensing a rotation speed of an internal transmission component other than the transmission input and output shafts;

f) analyzing the sensed rotation speed as a function of the target speed change value; and g) if the analysis satisfies a predetermined criteria storing a value associated with the applied test pressure signal as the calibration value; and f) if the analysis does not satisfy said predetermined criteria, modifying the test hydraulic signal and repeating steps d) through f).

\* \* \* \* \*